(12) United States Patent
Matula

(10) Patent No.: US 6,978,289 B1
(45) Date of Patent: Dec. 20, 2005

(54) APPARATUS AND METHOD FOR MINIMIZING ACCUMULATED ROUNDING ERRORS IN COEFFICIENT VALUES IN A LOOKUP TABLE FOR INTERPOLATING POLYNOMIALS

(75) Inventor: David W. Matula, Dallas, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 497 days.

(21) Appl. No.: 10/108,251

(22) Filed: Mar. 26, 2002

(51) Int. Cl.[7] .................. G06F 7/38
(52) U.S. Cl. .................. 708/551; 708/270
(58) Field of Search .............. 708/551, 497, 708/270–277

(56) References Cited

U.S. PATENT DOCUMENTS

| | | |
|---|---|---|
| 4,939,686 A | 7/1990 | Fandrianto |
| 5,046,038 A | 9/1991 | Briggs et al. |
| 5,475,360 A | 12/1995 | Guidette et al. |
| 5,862,059 A | 1/1999 | Matula et al. |
| 5,951,629 A * | 9/1999 | Wertheim et al. ........... 708/517 |
| 6,560,623 B1 * | 5/2003 | Smith ......................... 708/551 |
| 6,671,834 B1 | 12/2003 | Zhu et al. |
| 2001/0007990 A1 * | 7/2001 | Chen ........................... 708/270 |
| 2001/0051966 A1 * | 12/2001 | Pelton et al. ............... 708/270 |
| 2003/0101206 A1 * | 5/2003 | Graziano et al. ........... 708/277 |
| 2004/0059768 A1 * | 3/2004 | Denk et al. ................ 708/497 |

* cited by examiner

Primary Examiner—D. H. Malzahn

(57) ABSTRACT

An apparatus and method are disclosed for minimizing accumulated rounding errors in coefficient values in a lookup table for interpolating polynomials. Unlike prior art methods that individually round each polynomial coefficient of a function, the method of the present invention use a "ripple carry" rounding method to round each coefficient using information from the previously rounded coefficient. The "ripple carry" method generates rounded coefficients that significantly improve the total rounding error for the function.

21 Claims, 7 Drawing Sheets

$$f(x) = 0.14 + 0.34 x^2 + 0.74 x^4 + 0.44 x^6 \qquad (8)$$

$$f(1) = 0.14 + 0.34 + 0.74 + 0.44 = 1.66 \qquad (9)$$

$$f_a(x) = 0.1 + 0.3 x^2 + 0.7 x^4 + 0.4 x^6 \qquad (10)$$

$$f_a(1) = 0.1 + 0.3 + 0.7 + 0.4 = 1.5 \qquad (11)$$

$$\text{ERROR} = 1.66 - 1.5 = 0.16 \qquad (12)$$

FIG. 3
(PRIOR ART)

$$f(x) = C_0 + C_2 x^2 + C_4 x^4 + C_6 x^6 \qquad (13)$$

$$f_a(x) = A_0 + A_2 x^2 + A_4 x^4 + A_6 x^6 \qquad (14)$$

$$A_0 = \text{Round}(C_0) \qquad (15)$$

$$E_0 = C_0 - A_0 \qquad (16)$$

FIG. 4
(PRIOR ART)

$$A_0 = \text{Round}(C_0) \qquad E_0 = C_0 - A_0 \qquad (17)$$

$$A_2 = \text{Round}(C_2) \qquad E_2 = C_2 - A_2 \qquad (18)$$

$$A_4 = \text{Round}(C_4) \qquad E_4 = C_4 - A_4 \qquad (19)$$

$$A_6 = \text{Round}(C_6) \qquad E_6 = C_6 - A_6 \qquad (20)$$

FIG. 5
(PRIOR ART)

$$A_0 = \text{Round}(C_0) \qquad E_0 = C_0 - A_0 \qquad (21)$$

$$A_2 = \text{Round}(C_2 + E_0) \qquad E_2 = (C_2 + E_0) - A_2 \qquad (22)$$

$$A_4 = \text{Round}(C_4 + E_2) \qquad E_4 = (C_4 + E_2) - A_4 \qquad (23)$$

$$A_6 = \text{Round}(C_6 + E_4) \qquad E_6 = (C_6 + E_4) - A_6 \qquad (24)$$

FIG. 6

$$A_0 = \text{Round}(0.14) = 0.1 \qquad (25)$$

$$E_0 = 0.14 - 0.1 = 0.04 \qquad (26)$$

$$A_2 = \text{Round}(0.34 + 0.04) = 0.4 \qquad (27)$$

$$E_2 = (0.34 + 0.04) - 0.4 = -0.02 \qquad (28)$$

$$A_4 = \text{Round}(0.74 - 0.02) = 0.7 \qquad (29)$$

$$E_4 = (0.74 - 0.02) - 0.7 = 0.02 \qquad (30)$$

$$A_6 = \text{Round}(0.44 + 0.02) = 0.5 \qquad (31)$$

$$E_6 = (0.44 + 0.02) - 0.5 = -0.04 \qquad (32)$$

FIG. 7

$$f_a(x) = 0.1 + 0.4 x^2 + 0.7 x^4 + 0.5 x^6 \qquad (33)$$

$$f_a(1) = 0.1 + 0.4 + 0.7 + 0.5 = 1.7 \qquad (34)$$

$$\text{ERROR} = 1.66 - 1.7 = -0.04 \qquad (35)$$

FIG. 8

$$f(x) = C_0 + C_2 d^2 2^{-2i} + C_4 d^4 2^{-4i} + C_6 d^6 2^{-6i} + FE \qquad (40)$$

$$C_{2j} = C_{2j}(1.b_1 b_2 b_3 \ldots b_i) \text{ for } j = 0, 1, 2, 3 \qquad (41)$$

FIG. 9

$$f(x) - f_a(x) = (C_0 - A_0) + (C_2 - A_2)x^2 + (C_4 - A_4)x^4 + (C_6 - A_6)x^6 \qquad (42)$$

$$f(x) - f_a(x) = E_0 + (E_2 - E_0)x^2 + (E_4 - E_2)x^4 + (E_6 - E_4)x^6 \qquad (43)$$

$$f(x) - f_a(x) = E_0(1 - x^2) + E_2(x^2(1 - x^2)) + E_4(x^4(1 - x^2)) + E_6 x^6 \qquad (44)$$

$$w_0(x) = (1 - x^2) \qquad (45)$$

$$w_2(x) = x^2(1 - x^2) \qquad (46)$$

$$w_4(x) = x^4(1 - x^2) \qquad (47)$$

$$w_6(x) = x^6 \qquad (48)$$

$$f(x) - f_a(x) = E_0 w_0 + E_2 w_2 + E_4 w_4 + E_6 w_6 \qquad (49)$$

$$\max_i \{|E_i|\} \leq 2^{-(n+1)} \qquad (52)$$

FIG. 10

APPARATUS AND METHOD FOR MINIMIZING ACCUMULATED ROUNDING ERRORS IN COEFFICIENT VALUES IN A LOOKUP TABLE FOR INTERPOLATING POLYNOMIALS

CROSS REFERENCE TO RELATED APPLICATION

The present invention is related to that disclosed in the following United States Non-Provisional Patent Application:

U.S. patent application Ser. No. 10/107,598, filed concurrently herewith on Mar. 26, 2002, entitled "APPARATUS AND METHOD FOR PROVIDING HIGHER RADIX REDUNDANT DIGIT LOOKUP TABLES FOR RECODING AND COMPRESSING FUNCTION VALUES."

The above patent application is commonly assigned to the assignee of the present invention. The disclosures in this related patent application are hereby incorporated by reference for all purposes as if fully set forth herein.

FIELD OF THE INVENTION

The present invention relates generally to the field of computer technology. The present invention provides an improved apparatus and method for minimizing accumulated rounding errors in coefficient values in a lookup table for interpolating polynomials.

BACKGROUND OF THE INVENTION

In binary computing devices hardware direct lookup tables are typically employed for function evaluation and for reciprocal and root reciprocal seed values for division and square root procedures. For direct table lookup of a function of a normalized "p" bit argument $1 \leq x=1.b_1b_2 \ldots b_ib_{i+1} \ldots b_{p-1}<2$, the "i" leading bits $b_1b_2 \ldots b_i$ provide an index to a table yielding "j" output bits that determine the approximate function value.

The calculation of values of elementary functions usually uses a polynomial approximation method. The accuracy of the coefficients of the polynomial determines the accuracy of the calculated value of the function. The polynomial coefficients are usually stored in a "constant store" portion (or lookup table) of a "read only memory" of an arithmetic logic unit of a data processor.

The accuracy of the each polynomial coefficient depends upon the number of bits used to express the polynomial coefficient. In practice the last digit of each polynomial coefficient is rounded to give an approximate value of the coefficient.

Prior art methods separately round each individual polynomial coefficient of a function. Because each individual polynomial coefficients is rounded separately, rounding errors accumulate and contribute to value of the total rounded error of the function.

Accordingly, there is a need in the art for a method of rounding the polynomial coefficients of a function so that rounding errors are minimized for each polynomial coefficient of the function. There is also a need in the art for a method of rounding the polynomial coefficients of a function so that total accumulated rounding errors are minimized for the function.

SUMMARY OF THE INVENTION

The present invention is directed to an apparatus and method for minimizing accumulated rounding errors in coefficient values in a lookup table for interpolating polynomials.

An advantageous embodiment of the present invention comprises an apparatus and method for minimizing accumulated rounding errors in coefficient values in a lookup table for interpolating polynomials. Unlike prior art methods that individually round each polynomial coefficient of a function, the method of the present invention use a "ripple carry" rounding method to round each coefficient using information from the previously rounded coefficient. The "ripple carry" method generates rounded coefficients that significantly improve the total rounding error for the function.

It is an object of the present invention to provide an apparatus and method for rounding the polynomial coefficients of a function so that rounding errors are minimized for each polynomial coefficient of the function.

It is another object of the present invention to provide an apparatus and method for rounding the polynomial coefficients of a function so that total accumulated rounding errors are minimized for the function.

It is also an object of the present invention to provide a data processor that contains rounded polynomial coefficients with minimum rounding errors.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which:

FIG. 3 illustrates five equations that show how a prior art rounding method may be applied to round polynomial coefficients in a specific example;

FIG. 4 illustrates four equations that show how a prior art rounding method may be applied to round a first polynomial coefficient of a plurality of polynomial coefficients;

FIG. 5 illustrates four equations that show how a prior art rounding method may be applied to round a plurality of polynomial coefficients;

FIG. 6 illustrates four equations that show how the "ripple carry" rounding method of the present invention may be applied to round a plurality of polynomial coefficients;

FIG. 7 illustrates eight equations that show how the "ripple carry" rounding method of the present invention may be applied to round a plurality of polynomial coefficients for the function f(x) shown in Equation 8 of FIG. 3;

FIG. 8 illustrates three equations that show how the total rounding error may be calculated for the "ripple carry" rounding method of the present invention applied to the function f(x) shown in Equation 8 of FIG. 3;

FIG. 9 illustrates two equations that show how a polynomial expression for a function f(x) may be expressed with a plurality of polynomial coefficients where each polynomial coefficient is accurate to an $i^{th}$ bit;

FIG. 10 illustrates nine equations that show how a total rounding error for the "ripple carry" method of the present invention may be expressed as a convex combination of weighted individual "ripple carry" rounding errors;

DETAILED DESCRIPTION OF THE INVENTION

FIGS. 1 through 13, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged lookup table unit in a central processing unit of a computer system.

Figure 1:
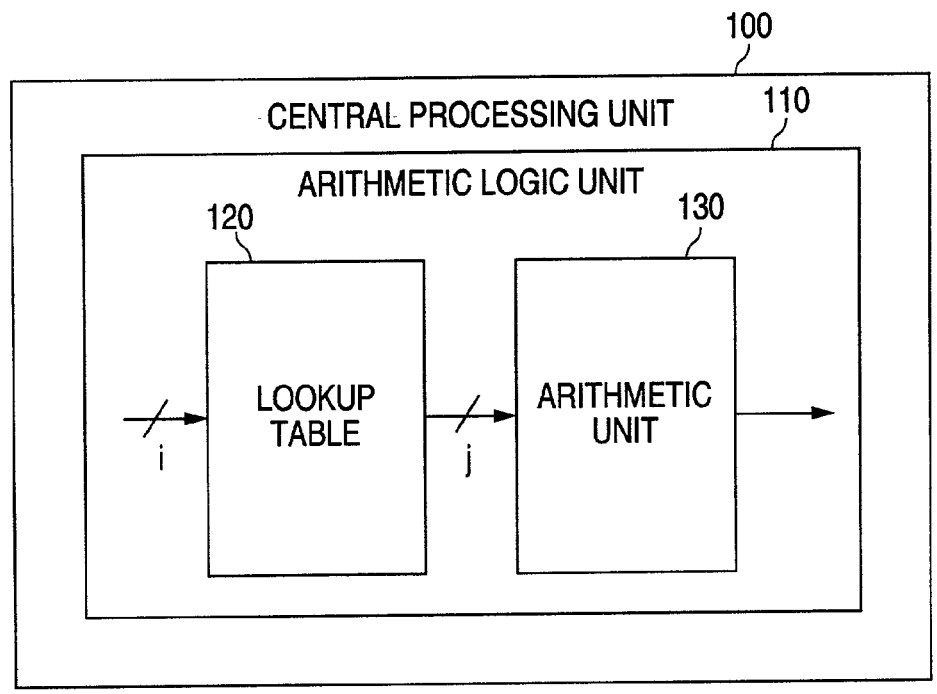
FIG. 1 illustrates a block diagram of a portion of a central processing unit showing a prior art arithmetic logic unit comprising a lookup table and an arithmetic unit.

FIG. 1 illustrates a block diagram of a portion of a central processing unit 100 showing a prior art arithmetic logic unit (ALU) 110. Arithmetic logic unit 110 comprises a lookup table (LUT) 120 and an arithmetic unit 130. Lookup table 120 receives data in the form of "i" input bits. Lookup table 120 outputs data to arithmetic unit 130 in the form of "j" output bits in accordance with principles that are well known in the prior art. Arithmetic unit 130 may comprise a multiplier unit, an adder unit, a microprogram storage unit, or other type of computational unit.

Figure 2:
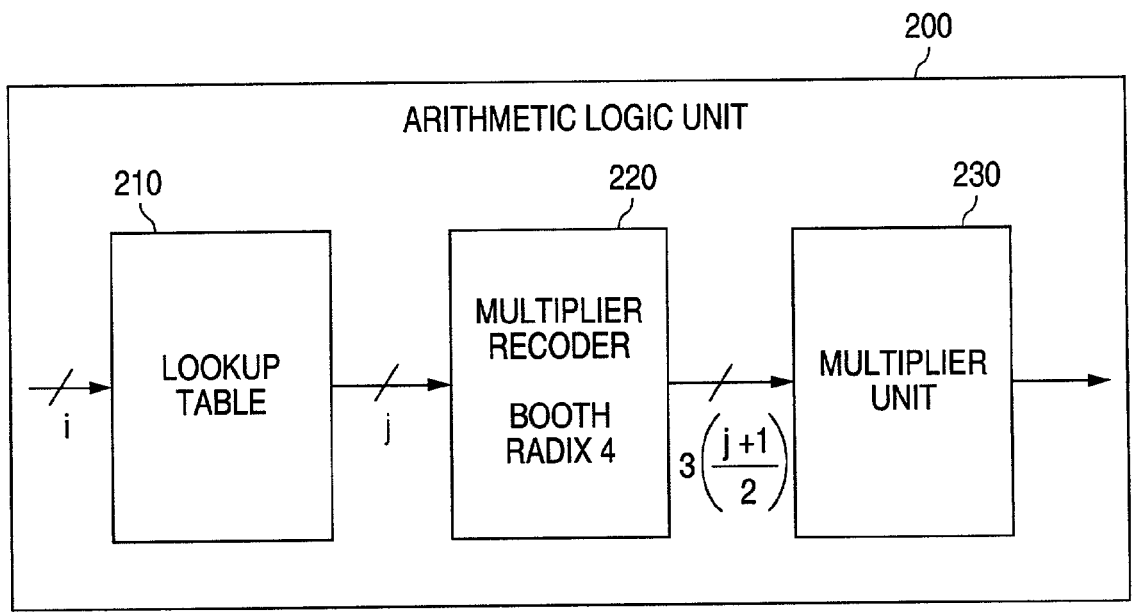
FIG. 2 illustrates a block diagram of a prior art arithmetic logic unit comprising a lookup table, a multiplier recoder, and a multiplier unit.

FIG. 2 illustrates a block diagram of a prior art arithmetic logic unit (ALU) 200 comprising lookup table 210, multiplier recoder 220, and multiplier unit 230. Lookup table 210 receives data in the form of "i" input bits. Lookup table 210 outputs data to multiplier recoder 220 in the form of "j" output bits in accordance with principles that are well known in the prior art. Multiplier recoder 220 comprises a Booth "radix 4" multiplier recoder. Also in accordance with principles that are well known in the prior art multiplier recoder 220 outputs to multiplier unit 230 a number of bits equal to $$3 \left\lceil \frac{(j+1)}{2} \right\rceil$$

bits where the bottomless brackets denote taking the smallest integer greater than or equal to the expression within the bottomless brackets.

The calculation of values of elementary functions is usually made using a polynomial approximation method. The accuracy of the coefficients of the polynomial determines the accuracy of the calculated value of the function. Consider the following polynomial approximation for the decimal logarithm of x.

$$\log_{10} x = a_1 t + a_3 t^3 + a_5 t^5 + a_7 t^7 + a_9 t^9 + E(x) \tag{1}$$

where $t=(x-1)/(x+1)$. The polynomial approximation is valid for x values in the range $$\frac{1}{\sqrt{10}} \leq x \leq \sqrt{10} \tag{2}$$

The values of the polynomial coefficients are:

$$a_1 = 0.86859\ 1718 \tag{3}$$

$$a_3 = 0.28933\ 5524 \tag{4}$$

$$a_5 = 0.17752\ 2071 \tag{5}$$

$$a_7 = 0.09437\ 6476 \tag{6}$$

$$a_9 = 0.19133\ 7714 \tag{7}$$

The accuracy of the values of the polynomial coefficients shown in Equation 3 through Equation 7 is sufficient to ensure that the absolute value of the error E(x) is less than $10^{-7}$.

The values of the polynomial coefficients are stored in a hardware direct lookup table. The values of the polynomial coefficients must be rounded (or truncated) at some point for storage in a lookup table. The prior art method for rounding polynomial coefficients individually rounds each polynomial coefficient.

FIG. 3 shows five (5) equations that illustrate an exemplary prior art method for rounding coefficients in a polynomial that expresses the value of an exemplary function f(x). The function f(x) shown in Equation 8 of FIG. 1 is an even function. That is, the terms of the function f(x) are in even powers of x. Functions that are of odd powers of x and mixed powers of x will be discussed later.

The first coefficient of the function f(x) shown in FIG. 1 has a value of 0.14. This first coefficient will be designated with the expression $C_0$. The second coefficient (for $x^2$) has a value of 0.34 and is designated with the expression $C_2$. The third coefficient (for $x^4$) has a value of 0.74 and is designated with the expression $C_4$. Lastly, the fourth coefficient (for $x^6$) has a value of 0.44 and is designated with the expression $C_6$.

For purposes of illustration the coefficients of f(x) will be assumed to be exact to two decimal places. Therefore, when the value of x is set equal to one ("1") the exact value of the function f(1) shown in Equation 9 is 1.66.

The prior art method of rounding the coefficients in a polynomial comprises rounding each coefficient individually. The expression $f_a(x)$ shown in Equation 10 of FIG. 3 shows the result of rounding the coefficients $C_0$ through $C_6$ in Equation 8. The value 0.14 of coefficient $C_0$ rounds down to the value 0.1. The value 0.34 of coefficient $C_2$ rounds down to the value 0.3. The value 0.74 of coefficient $C_4$ rounds down to the value 0.7. The value 0.44 of coefficient $C_6$ rounds down to the value 0.4.

In order to measure the accuracy provided by the expression $f_a(x)$ with rounded coefficients the value of x is set equal to one ("1") in Equation 10. The result is $f_a(1)$ as shown in Equation 11. The value of $f_a(1)$ is 1.5. Therefore, the error between the exact value of 1.66 for f(1) and the rounded value of 1.5 for $f_a(1)$ is 0.16. This result is shown in Equation 12. This error value of 0.16 will later be compared with an error value obtained using the method of the present invention.

In Equation 13 of FIG. 4 the function f(x) is shown with the coefficients expressed as $C_0$, $C_2$, $C_4$ and $C_6$. In Equation 14 the function $f_a(x)$ is shown with the rounded coefficients expressed as $A_0$, $A_2$, $A_4$ and $A_6$. In the prior art method of rounding coefficients each rounded coefficient $A_i$ is obtained by rounding its corresponding coefficient $C_i$. An example of this is shown in Equation 15 where the rounded coefficient $A_0$ is equal to the rounded value of coefficient $C_0$.

The rounding error $E_i$ for each coefficient is obtained by subtracting the value of the rounded coefficient $A_i$ from the value of its corresponding coefficient $C_i$. An example of this is shown in Equation 16 where the rounding error $E_0$ is equal to the value of the coefficient $C_0$ minus the value of the rounded coefficient $A_0$.

FIG. 5 generally illustrates the equations that are used in the prior art method of rounding coefficients. As shown in Equations 17 through 20, each rounded coefficient $A_i$ is obtained by rounding its corresponding coefficient $C_i$. The rounding error $E_i$ for each coefficient is obtained by subtracting the value of the rounded coefficient $A_i$ from the value of its corresponding coefficient $C_i$. For example, rounded coefficient $A_4$ is obtained by rounding the corresponding coefficient $C_4$. The rounding error $E_4$ for rounded coefficient $A_4$ is obtained by subtracting the value of the rounded coefficient $A_4$ from the value of corresponding coefficient $C_4$.

FIG. 6 illustrates the method of rounding coefficients of the present invention. Only the first rounded coefficient $A_0$ is obtained using the coefficient rounding method of the prior art. This step is shown in Equation 21. In the next portion of the method of present invention (shown in Equation 22), the rounded coefficient $A_2$ is obtained by adding the rounding error $E_0$ (from Equation 21) to coefficient $C_2$ and rounding the sum of $C_2$ and $E_0$. The rounding error $E_2$ for rounded coefficient $A_2$ is then computed by subtracting the value of rounded coefficient $A_2$ from the sum of coefficient $C_2$ and rounding error $E_0$ (as shown in Equation 22).

In the next portion of the method of present invention (shown in Equation 23), the rounded coefficient $A_4$ is obtained by adding the rounding error $E_2$ (from Equation 22) to coefficient $C_4$ and rounding the sum of $C_4$ and $E_2$. The rounding error $E_4$ for rounded coefficient $A_4$ is then computed by subtracting the value of rounded coefficient $A_4$ from the sum of coefficient $C_4$ and rounding error $E_2$ (as shown in Equation 23).

In the next portion of the method of present invention (shown in Equation 24), the rounded coefficient $A_6$ is obtained by adding the rounding error $E_4$ (from Equation 23) to coefficient $C_6$ and rounding the sum of $C_6$ and $E_4$. The rounding error $E_6$ for rounded coefficient $A_6$ is then computed by subtracting the value of rounded coefficient $A_6$ from the sum of coefficient $C_6$ and rounding error $E_4$ (as shown in Equation 24).

The method of the present invention can be continued for as many terms as there are in the polynomial. In the present example there are only four terms in the function f(x) and so only four rounded coefficients ($A_0$, $A_2$, $A_4$, $A_6$) are calculated. Except for the first rounded coefficient $A_0$, the method of the present invention calculates each rounded coefficient $A_i$ using the value of the rounding error for the previous rounded coefficient. For this reason the method of the present invention is referred to as the "ripple carry" rounding method.

FIG. 7 illustrates how the "ripple carry" rounding method of the present invention may be applied to calculate rounded coefficients for the function f(x) shown in Equation 8 of FIG. 3. The first rounded coefficient $A_0$ is obtained from rounding the value 0.14 of $C_0$. As shown in Equation 25 the result for rounded coefficient $A_0$ is 0.1. The rounding error $E_0$ is equal to $C_0$ minus $A_0$. This value is 0.14 minus 0.1. As shown in Equation 26 the result for rounding error $E_0$ is 0.04.

The next rounded coefficient $A_2$ is obtained from rounding the sum of $C_2$ ($C_2$ equals 0.34) and the rounding error $E_0$ ($E_0$ equals 0.04). The sum of $C_2$ and $E_0$ is 0.38. As shown in Equation 27 the result for rounded coefficient $A_2$ is 0.4. The rounding error $E_2$ is equal to $C_2$ plus $E_0$ minus $A_2$. This value is 0.34 plus 0.04 minus 0.4. As shown in Equation 28 the result for rounding error $E_2$ is negative 0.02.

The next rounded coefficient $A_4$ is obtained from rounding the sum of $C_4$ ($C_4$ equals 0.74) and the rounding error $E_2$ ($E_2$ equals negative 0.02). The sum of $C_4$ and $E_2$ is 0.72. As shown in Equation 29 the result for rounded coefficient $A_4$ is 0.7. The rounding error $E_4$ is equal to $C_4$ plus $E_2$ minus $A_4$. This value is 0.74 plus (negative 0.02) minus 0.7. As shown in Equation 30 the result for rounding error $E_2$ is a positive 0.02.

The next rounded coefficient $A_6$ is obtained from rounding the sum of $C_6$ ($C_6$ equals 0.44) and the rounding error $E_4$ ($E_4$ equals 0.02). The sum of $C_6$ and $E_4$ is 0.46. As shown in Equation 31 the result for rounded coefficient $A_6$ is 0.5. The rounding error $E_6$ is equal to $C_6$ plus $E_4$ minus $A_6$. This value is 0.44 plus 0.02 minus 0.5. As shown in Equation 32 the result for rounding error $E_6$ is a negative 0.04.

FIG. 8 illustrates how the rounded coefficient values $A_0$, $A_2$, $A_4$, and $A_6$ generated by the "ripple carry" rounding method described in FIG. 7 may be applied to calculate an approximate value of the function f(x) shown in Equation 8 of FIG. 3. Inserting the rounded coefficient values $A_0$, $A_2$, $A_4$, and $A_6$ into Equation 14 of FIG. 4 gives Equation 33 of FIG. 8. Equation 33 is a more accurate approximation of Equation 8 than the approximation of Equation 10 that was obtained by the prior art rounding method.

The increase in accuracy provided by the method of the present invention may be seen by calculating the value of $f_a(x)$ in Equation 33 for the value of x equal to one ("1"). As shown in Equation 34, $f_a(1)$ equals 1.7. Therefore, the error between the exact value of 1.66 for f(1) and the rounded value of 1.7 for $f_a(1)$ in Equation 34 is a negative 0.04. This result is shown in Equation 35. The absolute value of the error obtained using the "ripple carry" rounding method of the present invention is four (4) times more accurate than the value of the error obtained using the prior art method of rounding.

This relatively simple example set forth above provides an understanding how the "ripple carry" rounding method of the present invention operates. In practice many digits are used to express each coefficient in a high level of accuracy. For example, it is not unusual for a coefficient term to be represented as many as sixty four (64) binary digits.

Consider a transcendental function f(x) over a normalized interval $1 \leq x \leq 2$. Suppose that a value of x is represented by "p" digits in the form:

$$x=1.b_1b_2b_3 \ldots b_ib_{i+1} \ldots b_{p-1} \tag{36}$$

where the integer one ("1") is represented by one bit and the fraction is represented by "p-1" binary bits (i.e., bits $b_1$ through $b_{p-1}$). A value of x that is truncated at bit $b_i$ is designated with the symbol $x_i$.

$$x_i=1.b_1b_2b_3 \ldots b_i \tag{37}$$

Then let the letter "d" designate a fraction that is represented by bits $b_{1+1}$ through bit $b_{p-1}$.

$$d=0.b_{1+1}b_{i+2}b_{1+3} \ldots b_{p-1} \tag{38}$$

The expression for x in Equation 36 may then be represented by $$x=x_i+d2^{-i} \tag{39}$$

where the fraction "d" has been multiplied by the factor $2^{-i}$ to reduce the value of "d" to an appropriate value so that the value "$d\ 2^{-i}$" added to $x_i$ yields the value x.

Now suppose that the function f(x) is approximated by an even polynomial shown in Equation 40 of FIG. 9. The term "FE" represents a "function error" that is of order "$d^8 2^{-8i}$." FE is suitably small and may be neglected. As shown in Equation 41, each of the coefficients of f(x) ($C_0$, $C_2$, $C_4$, and $C_6$) is represented by a value that is truncated at the $i^{th}$ bit. That is, bit $b_i$ is the last bit in the fraction of each coefficient.

Each coefficient of f(x) ($C_0$, $C_2$, $C_4$, and $C_6$) is determined by looking up a value in a lookup table. The lookup table is indexed by the same leading "i" bits of the normalized argument's fraction.

In a prior art lookup table each coefficient is truncated independently to provide an output for the lookup table. Each coefficient is truncated independently to the same last fixed point position designated with the letter "n." This means that an independent rounding error of order $2^{-(n+1)}$ is introduced for each coefficient. When, as in our example, there are four coefficients, then four independent rounding errors of order $2^{-(n+1)}$ are introduced. In a worst case scenario when the fraction "d" approaches a value of one ("1"), the total rounding error could approach a value of four (4) times the value $2^{-(n+1)}$. That is, the total rounding error could approach a value of $4[2^{-(n+1)}]$.

The "ripple carry" rounding method of the present invention solves this problem by iteratively creating lookup table values so that the total rounding error is a convex combination of the individual rounding errors. A "convex" combination is a linear combination that sums to a value of one ("1"). The total rounding error using the method of the present invention is bounded by the value $2^{-(n+1)}$. The "ripple carry" rounding method provides a significant improvement over the accuracy obtainable by prior art methods.

The $2^{-(n+1)}$ bound on the total rounding error of the "ripple carry" rounding method by seen by considering the "ripple carry" rounding equations. FIG. 10 illustrates several expressions for the total rounding error "$f(x)-f_a(x)$." Subtracting Equation 14 from Equation 13 yields Equation 42 of FIG. 10. Equation 43 of FIG. 10 is obtained by substituting the expressions for the rounding error values $E_0$ through $E_6$ from Equations 21 through 24. Equation 44 of FIG. 10 is obtained by factoring out the individual rounding error values $E_0$ through $E_6$.

As can be seen with reference to Equation 44 each rounding error value $E_0$ through $E_6$ may be considered to be multiplied by a "weight value" ($w_i$ where i=0, 2, 4, 6) As shown in Equations 45 through 48, the weight value for $E_0$ is $(1-x^2)$, the weight value for $E_2$ is $x^2(1-x^2)$, the weight value for $E_4$ is $x^4(1-x^2)$, and the weight value for $E_6$ is $x^6$. Therefore, the total rounding error may be expressed in Equation 49 as:

$$f(x)-f_a(x)=E_0w_0+E_2w_2+E_4W_4+E_6w_6 \tag{49}$$

The weight values, $w_i$, satisfy the condition:

$$0 \leq w_i \leq 1 \text{ for } 0 \leq x \leq 1 \tag{50}$$

The weight values, $w_i$, also satisfy the condition:

$$w_0+w_2+w_4+w_6=1 \tag{51}$$

Equation 49 shows that the total rounding error for the "ripple carry" rounding method of the present invention is a convex combination of $E_0$ and $E_2$ and $E_4$ and $E_6$, the individual "ripple carry" rounding errors. Therefore, the maximum value of the total "ripple carry" rounding error is bounded (as shown in Equation 52 of FIG. 10) by the value $2^{-(n+1)}$.

Figure 11:
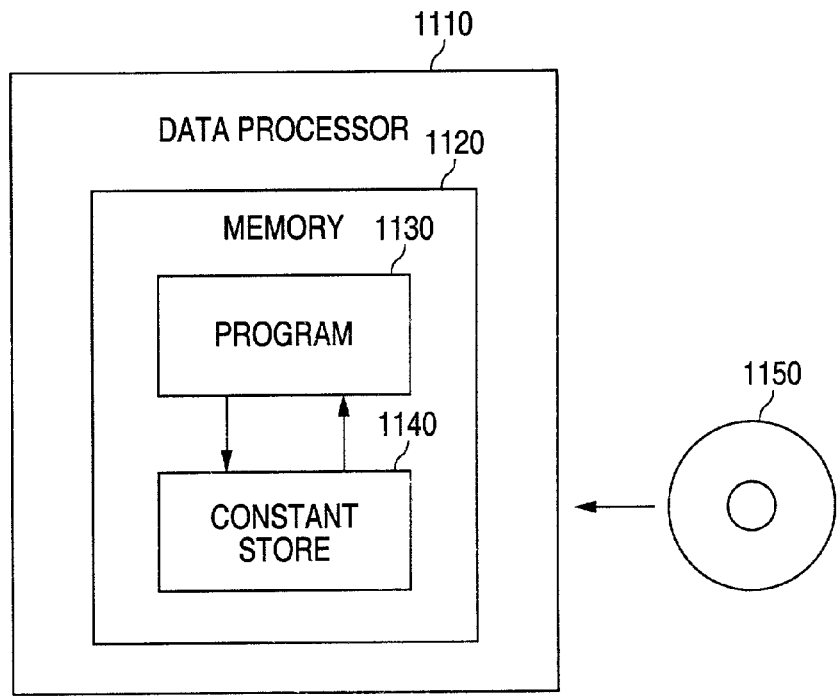
FIG. 11 illustrates a data processor comprising a memory comprising a constant store portion that contains polynomial coefficients rounded by the "ripple carry" rounding method of the present invention.

FIG. 11 illustrates a data processor 1110 constructed in accordance with the principles of the present invention. Data processor 1110 comprises memory 1120 capable of containing at least one program 1130. Memory 1120 comprises a constant store portion 1140 that contains polynomial coefficients that have been rounded by the "ripple carry" rounding method of the present invention.

Memory 1120 may comprise random access memory (RAM) or a combination of random access memory (RAM) and read only memory (ROM). Memory 1120 may comprise a non-volatile random access memory (RAM), such as flash memory. In an alternate advantageous embodiment of data processor 1110, memory 1120 may comprise a mass storage data device, such as a hard disk drive (not shown). Memory 1120 may also include an attached peripheral drive or removable disk drives (whether embedded or attached) that reads read/write DVDs or re-writable CD-ROMs. As illustrated schematically in FIG. 11, removable disk drives of this type are capable of receiving and reading re-writable CD-ROM disk 1150.

Figure 12:
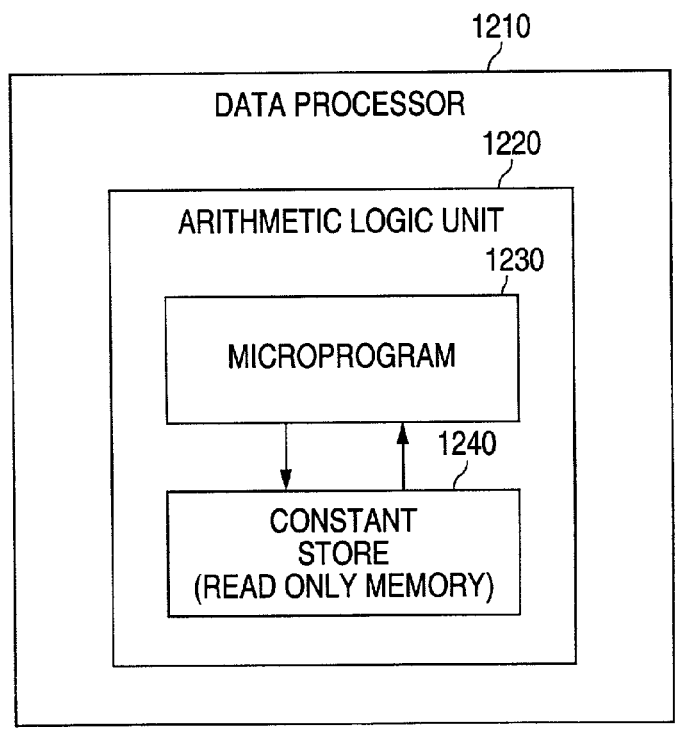
FIG. 12 illustrates a data processor comprising an arithmetic logic unit comprising a constant store read only memory (ROM) unit that contains polynomial coefficients rounded by the "ripple carry" rounding method of the present invention.

FIG. 12 illustrates a data processor 1210 constructed in accordance with the principles of the present invention. Data processor 1210 comprises arithmetic logic unit 1220 capable of containing at least one microprogram 1230. Arithmetic logic unit 1220 comprises constant store unit 1240 that contains polynomial coefficients that have been rounded by the "ripple carry" rounding method of the present invention.

Figure 13:
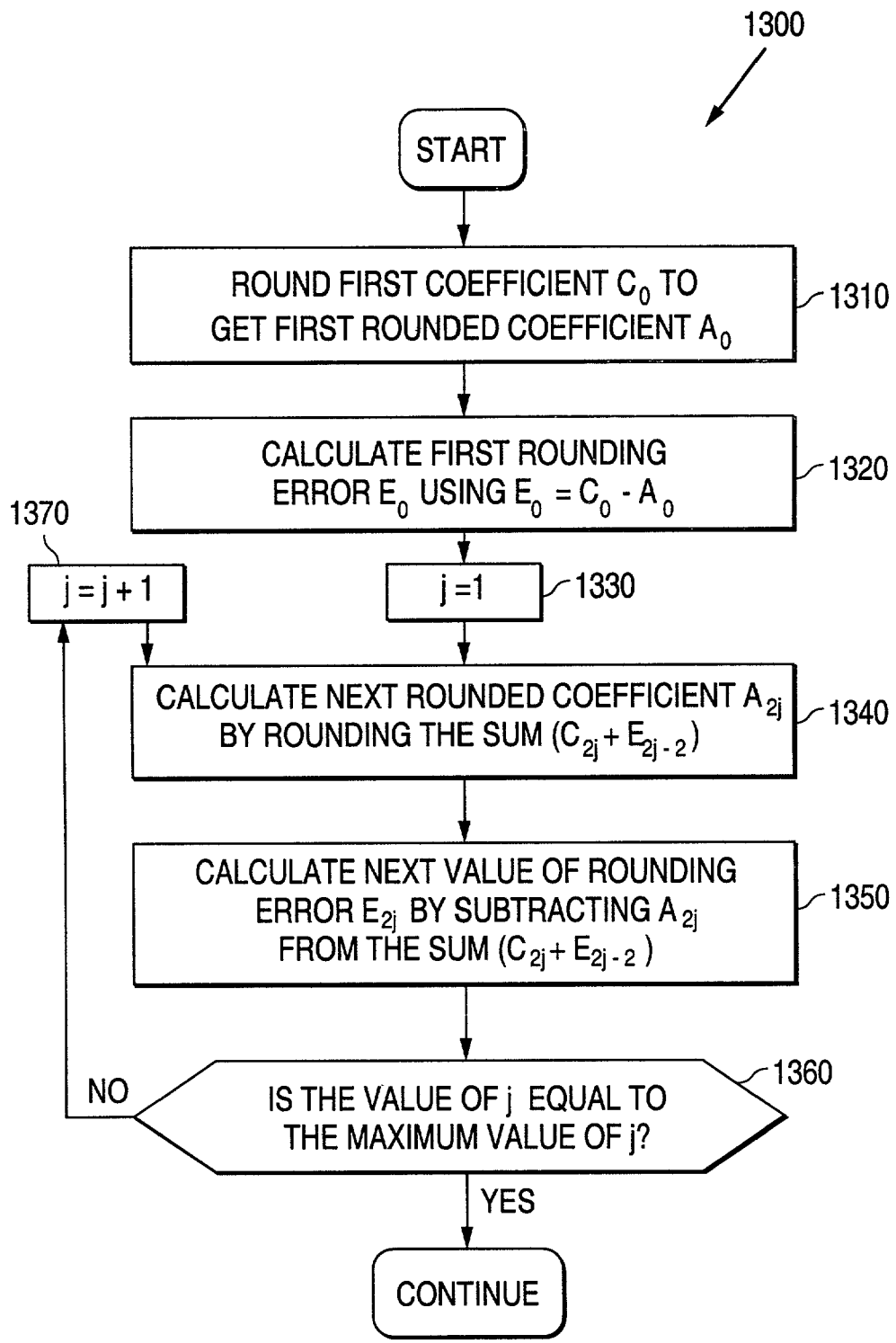
FIG. 13 illustrates a flow chart showing the steps of one advantageous embodiment of a method of the present invention.

FIG. 13 illustrates a flow chart showing the steps of one advantageous embodiment of a method of the present invention. The steps are collectively referred to with reference numeral 1300. The first coefficient $C_0$ is rounded to obtain the first rounded coefficient $A_0$ (step 1310). Then the first rounding error $E_0$ is calculated using the equation $E_0 = C_0 - A_0$ (step 1220).

The index "j" is then set equal to one ("1") (step 1330). Then the next rounded coefficient $A_{2j}$ is calculated by rounding the sum $(C_{2j} + E_{2j-2})$ (step 1340). Then the next value of the rounding error $E_{2j}$ is calculated by subtracting $A_{2j}$ from the sum $(C_{2j} + E_{2j-2})$ (step 1350). The values $A_{2j}$ and $E_{2j}$ are stored in memory.

Then a determination is made whether the index "j" is equal to the maximum value of "j." (step 1360). If the value of the index "j" is not equal to the maximum value of "j," then the index "j" is incremented (step 1370). Control is then passed to step 1340 to calculate the next values of $A_{2j}$ and $E_{2j}$ for the new value of "j."

When the value of the index "j" equals the maximum value of "j," then all of the required values of $A_{2j}$ and $E_{2j}$ have been calculated. Control is then passed to the next portion of the computer software (not shown) that uses the calculated values of $A_{2j}$ and $E_{2j}$.

An advantageous method of the present invention has been described for an "even" function (i.e., a function of even powers of x such as $x^2$, $x^4$, $x^6$, etc.). The method of the present invention is equally applicable for an "odd" function (i.e., a function of odd powers of x such as x, $x^3$, $x^5$, $x^7$, etc.). The index "2j" is replaced by the index "2j-1."

The method of the present invention may also be applied to a function of "mixed" powers of x (i.e., a function of both even and odd powers of x). For a "mixed" powers function, the function is first separated into to its odd and even parts. The method is applied to the odd and even parts separately. The rounded odd coefficients are used for the odd powers of x in the function and the rounded even coefficients are used for the even powers of x in the function.

The total amount of rounding error of a "mixed" powers function is the sum of the rounding error of the "even" powers portion and the rounding error of the "odd" powers portion. Therefore, the total amount of rounding error for a "mixed" powers function is approximately twice the rounding error of either the "even" or the "odd" powers portion.

Figure 14:
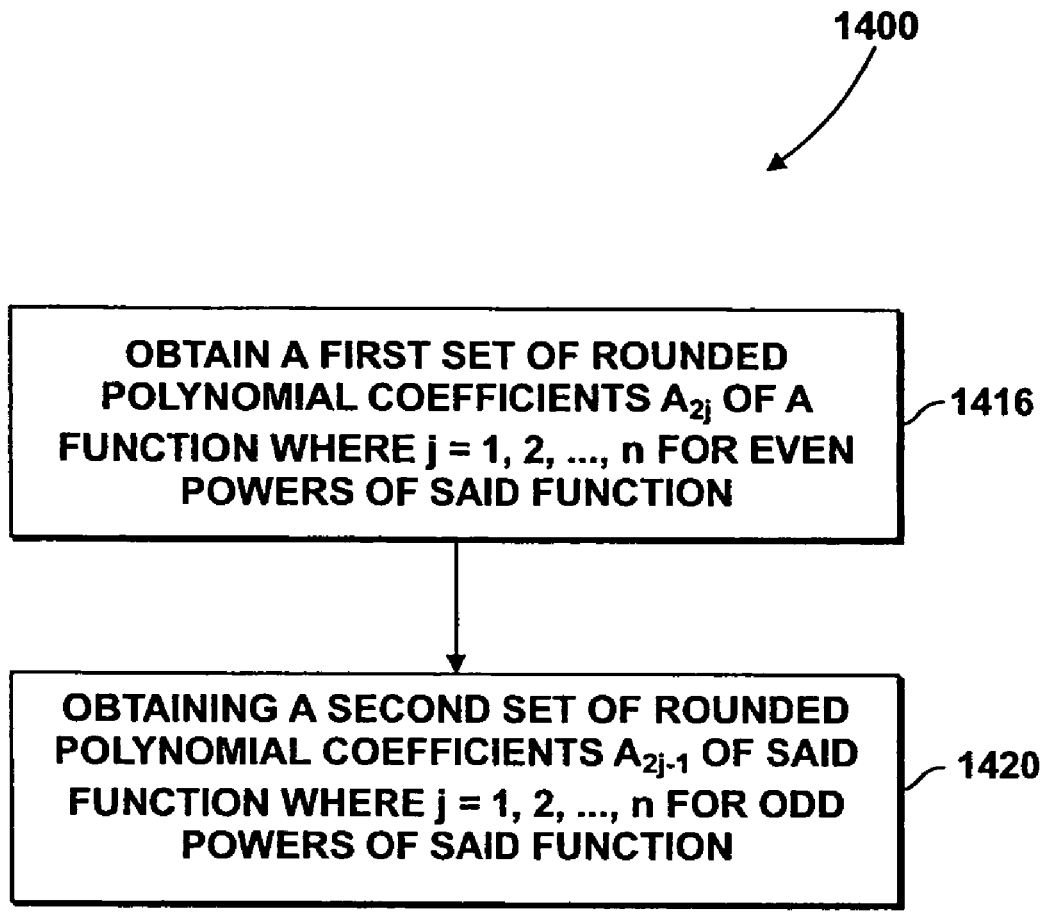
FIG. 14 illustrates a flow diagram in accordance with the present disclosure.

FIG. 14 illustrates a flow diagram in accordance with the present disclosure. At step 1410, a first set of rounded polynomial coefficients A2j of a function are obtained where j=1, 2, . . . , n for even powers of said function. At step 1420, a second set of rounded polynomial coefficients A2j-1 of said function are obtained where j=1, 2, . . . , n for even powers of said function.

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for obtaining a set of rounded polynomial coefficients of a function comprising:
    (a) obtaining a set of polynomial coefficients $C_{2j}$ of a function where j=0, 1, 2, . . . , n;
    (b) rounding a first coefficient $C_{2j}$ to obtain a first rounded coefficient $A_{2j}$ for j=0;
    (c) calculating a first rounding error $E_{2j}$ for j=0 by subtracting said first rounded coefficient $A_{2j}$ for j=0 from said first coefficient $C_{2j}$ for j=0;
    (d) incrementing the value of j by one;
    (e) calculating a value for next rounded coefficient $A_{2j}$ by rounding the sum of coefficient $C_{2j}$ and rounding error $E_{2j-2}$;
    (f) calculating a value for next rounding error $E_{2j}$ by subtracting a value of $A_{2j}$ from the sum of coefficient $C_{2j}$ and rounding error $E_{2j-2}$; and
    repeating (d), (e), and (f) until the value of j exceeds a predetermined maximum value.

2. A method as claimed in claim 1 wherein said function comprises a transcendental function.

3. A method as claimed in claim 1 further comprising: storing a plurality of rounded coefficients $A_{2j}$ in a computer-readable storage medium.

4. A method as claimed in claim 3 wherein said computer-readable storage medium is a constant store read only memory in a data processor.

5. A method as claimed in claim 1 further comprising:
    (a) obtaining a set of polynomial coefficients $C_{2j-1}$ of a function where j=1, 2, . . . , n;
    (b) rounding a first coefficient $C_{2j-1}$ to obtain a first rounded coefficient $A_{2j-1}$ for j=1;
    (c) calculating a first rounding error $E_{2j-1}$ for j=1 by subtracting said first rounded coefficient $A_{2j-1}$ for j=1 from said first coefficient $C_{2j-1}$ for j=1;
    (d) incrementing the value of j by one;
    (e) calculating a value for next rounded coefficient $A_{2j-1}$ by rounding the sum of coefficient $C_{2j-1}$ and rounding error $E_{2j-3}$;
    (f) calculating a value for next rounding $E_{2j-1}$ by subtracting a value of $A_{2j-1}$ from the sum of coefficient $C_{2j-1}$ and rounding error $E_{2j-3}$; and
    repeating (d), (e), and (f) until the value of j exceeds a predetermined maximum value.

6. A method as claimed in claim 5 wherein said function comprises at least one of: a trigonometric function, an exponential function, a logarithmic function, and a transcendental function.

7. A method as claimed in claim 5 further comprising: storing a plurality of rounded coefficients $A_{2j}$ in a computer-readable storage medium.

8. A method as claimed in claim 7 wherein said computer-readable storage medium is a constant store read only memory in a data processor.

9. A method as claimed in claim 1 wherein said function comprises a trigonometric function.

10. A method as claimed in claim 1 wherein said function comprises an exponential function.

11. A method as claimed in claim 1 wherein said function comprises a logarithmic function.

12. A data processor comprising:
    a memory containing rounded polynomial coefficients created by
    (a) obtaining a set of polynomial coefficients $C_{2j}$ of a function where j=0, 1, 2, . . . , n;
    (b) rounding a first coefficient $C_{2j}$ to obtain a first rounded coefficient $A_{2j}$ for j= 0;
    (c) calculating a first rounding error $E_{2j}$ for j=0 by subtracting said first rounded coefficient $A_{2j}$ for j=0 from said first coefficient $C_{2j}$ for j=0;
    (d) incrementing the value of j by one;

(e) calculating a value for next rounded coefficient $A_{2j}$ by rounding the sum of coefficient $C_{2j}$ and rounding error $E_{2j-2}$;

(f) calculating a value for next rounding error $E_{2j}$ by subtracting a value of $A_{2j}$ from the sum of coefficient $C_{2j}$ and rounding error $E_{2j-2}$; and repeating (d), (e), and (f) until the value of j exceeds a predetermined maximum value.

13. A data processor as claimed in claim 12 wherein obtaining the set of polynomial coefficients $A_{2j-1}$ comprises a ripple carry rounding method.

14. A data processor comprising:
   a memory containing rounded polynomial coefficients created by
   (a) obtaining a set of polynomial coefficients $C_{2j-1}$ of a function where j=1, 2, ..., n;
   (b) rounding a first coefficient $C_{2j-1}$ to obtain a first rounded coefficient $A_{2j-1}$ for j= 1;
   (c) calculating a first rounding error $E_{2j-1}$ for j=1 by subtracting said first rounded coefficient $A_{2j-1}$ for j=1 from said first coefficient $C_{2j-1}$ for j=1;
   (d) incrementing the value of j by one;
   (e) calculating a value for next rounded coefficient $A_{2j-1}$ by rounding the sum of coefficient $C_{2j-1}$ and rounding error $E_{2j-3}$;
   (f) calculating a value for next rounding $E_{2j-1}$ by subtracting a value of $A_{2j-1}$ from the sum of coefficient $C_{2j-1}$ and rounding error $E_{2j-3}$; and
   repeating (d), (e), and (f) until the value of j exceeds a predetermined maximum value.

15. A method for obtaining a set of rounded polynomial coefficients of a function comprising:
   (a) obtaining a first set of rounded polynomial coefficients $A_{2j}$ of said function where j= 1, 2, ..., n for even powers of said function using a ripple carry rounding method; and
   (b) obtaining a second set of rounded polynomial coefficients $A_{2j-1}$ of said function where j=1, 2, ..., n for odd powers of said function.

16. The method as claimed in claim 15 wherein obtaining said second set of rounded polynomial coefficients $A_{2j-1}$ comprises a ripple carry rounding method.

17. A method as claimed in claim 15 wherein said function comprises at least one of: a trigonometric function, an exponential function, a logarithmic function, and a transcendental function.

18. A method as claimed in claim 15 further comprising:
   storing said first set of rounded polynomial coefficients $A_{2j}$ and said second set of rounded polynomial coefficient $A_{2j-1}$ in a computer-readable storage medium.

19. A method as claimed in claim 18 wherein said computer-readable storage medium is a constant store read only memory in a data processor.

20. For use in a data processor capable of storing polynomial coefficients of a function, computer-executable instructions stored on a computer-readable storage medium for rounding polynomial coefficient values, the computer-executable instructions comprising:
   (a) obtaining a set of polynomial coefficients $C_{2j}$ of a function where j=0, 1, 2, ..., n;
   (b) rounding a first coefficient $C_{2j}$ to obtain a first rounded coefficient $A_{2j}$ for j=0;
   (c) calculating a first rounding error $E_{2j}$ for j=0 by subtracting said first rounded coefficient $A_{2j}$ for j=0 from said first coefficient $C_{2j}$ for j=0;
   (d) incrementing the value of j by one;
   (e) calculating a value for next rounded coefficient $A_{2j}$ by rounding the sum of coefficient $C_{2j}$ and rounding error $E_{2j-2}$;
   (f) calculating a value for next rounding error $E_{2j}$ by subtracting a value of $A_{2j}$ from the sum of coefficient $C_{2j}$ and rounding error $E_{2j-2}$; and
   repeating(d), (e), and (f) until the value of j exceeds a predetermined maximum value.

21. Computer-executable instructions stored on a computer-readable storage medium for rounding polynomial coefficient values as claimed in claim 19, wherein said computer-executable instructions comprise:
   (a) obtaining a set of polynomial coefficients $C_{2j-1}$ of a function where j=1, 2, ..., n;
   (b) rounding a first coefficient $C_{2j-1}$ to obtain a first rounded coefficient $A_{2j-1}$ for j=1;
   (c) calculating a first rounding error $E_{2j-1}$ for j=1 by subtracting said first rounded coefficient $A_{2j-1}$ for j=1 from said first coefficient $C_{2j-1}$ for j=1;
   (d) incrementing the value of j by one;
   (e) calculating a value for next rounded coefficient $A_{2j-1}$ by rounding the sum of coefficient $C_{2j-1}$ and rounding error $E_{2j-3}$;
   (f) calculating a value for next rounding error $E_{2j-1}$ by subtracting a value of $A_{2j-1}$ from the sum of coefficient $C_{2j-1}$ and rounding error $E_{2j-3}$; and
   repeating (d), (e), and (f) until the value of j exceeds a predetermined maximum value.

* * * * *

UNITED STATES PATENT AND TRADEMARK OFFICE
CERTIFICATE OF CORRECTION

PATENT NO. : 6,978,289 B1 Page 1 of 1
APPLICATION NO. : 10/108251
DATED : December 20, 2005
INVENTOR(S) : David W. Matula It is certified that error appears in the above-identified patent and that said Letters Patent is hereby corrected as shown below:

Column 12, line 29: Please change "claim 19" to -- claim 20 --

Signed and Sealed this

Eighth Day of August, 2006

JON W. DUDAS
*Director of the United States Patent and Trademark Office*